United States Patent
Bisht

(10) Patent No.: US 9,411,605 B2
(45) Date of Patent: Aug. 9, 2016

(54) DEVICE-LESS AND SYSTEM AGNOSTIC UNIFIED EXTENSIBLE FIRMWARE INTERFACE (UEFI) DRIVER

(71) Applicant: Pradeep Bisht, Mountain View, CA (US)

(72) Inventor: Pradeep Bisht, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 313 days.

(21) Appl. No.: 14/149,342

(22) Filed: Jan. 7, 2014

(65) Prior Publication Data

US 2015/0067317 A1  Mar. 5, 2015

Related U.S. Application Data

(60) Provisional application No. 61/871,618, filed on Aug. 29, 2013.

(51) Int. Cl.
*G06F 9/44* (2006.01)
*G06F 1/32* (2006.01)

(52) U.S. Cl.
CPC ............. *G06F 9/4411* (2013.01); *G06F 1/32* (2013.01)

(58) Field of Classification Search
CPC ............... G06F 1/32; G06F 1/26; G06F 1/28; G06F 1/00
USPC ......... 713/1, 2, 399, 400, 300, 310, 320, 321, 713/322, 323, 324, 330, 340, 370
See application file for complete search history.

(56) References Cited

U.S. PATENT DOCUMENTS

| | | | | |
|---|---|---|---|---|
| 7,734,945 | B1* | 6/2010 | Levidow | G06F 11/0793 714/3 |
| 7,757,112 | B2* | 7/2010 | Childs | G06F 11/1417 713/2 |
| 8,006,125 | B1* | 8/2011 | Meng | G06F 11/1417 714/6.2 |
| 2004/0068645 | A1* | 4/2004 | Larvoire | G06F 9/441 713/1 |
| 2004/0255106 | A1* | 12/2004 | Rothman | G06F 11/1417 713/1 |
| 2005/0027978 | A1* | 2/2005 | Neuman | G06F 9/4411 713/2 |
| 2006/0200626 | A1* | 9/2006 | Gabryjelski | G06F 11/1092 711/114 |
| 2010/0064127 | A1* | 3/2010 | Lee | G06F 11/1417 713/2 |
| 2010/0319001 | A1 | 12/2010 | Jones | |
| 2012/0117367 | A1 | 5/2012 | Lu et al. | |
| 2012/0254831 | A1 | 10/2012 | Mortensen | |
| 2014/0195791 | A1* | 7/2014 | Teli | G06F 11/1417 713/2 |

* cited by examiner

*Primary Examiner* — Jaweed A Abbaszadeh
*Assistant Examiner* — Keshab Pandey
(74) *Attorney, Agent, or Firm* — Sughrue Mion, PLLC

(57) ABSTRACT

Loading and executing a device-less and system agnostic Unified Extensible Firmware Interface (UEFI) driver configured to filter inputs/outputs (I/O) to storage devices without requiring dependency on a Peripheral Component Interconnect (PCI) type device and/or modifying a system UEFI Basic Input/Output System (BIOS), thereby enabling a software only product supporting booting of an Operating System (OS).

9 Claims, 2 Drawing Sheets

DEVICE-LESS AND SYSTEM AGNOSTIC UNIFIED EXTENSIBLE FIRMWARE INTERFACE (UEFI) DRIVER

CROSS-REFERENCE TO RELATED APPLICATION

This application claims the benefit of U.S. Provisional Application No. 61/871,618, filed on Aug. 29, 2013, in the U.S. Patent and Trademark Office, the disclosure of which is incorporated herein by reference in its entirety.

BACKGROUND

1. Field

Methods and programs consistent with exemplary embodiments relate to a Unified Extensible Firmware Interface (UEFI), and more particularly to loading and executing a device-less and system agnostic UEFI driver configured to filter inputs/outputs (I/O) to storage devices without requiring dependency on a Peripheral Component Interconnect (PCI) type device and/or modifying a system UEFI Basic Input/Output System (BIOS), thereby enabling a software only product supporting booting of an Operating System (OS).

2. Description of the Related Art

Generally, there exist two methods for loading a UEFI driver in a UEFI environment.

In a first method, a PCI device employs an Option-Read Only Memory (Option-ROM) UEFI driver, which resides in a ROM/flash memory on the PCI device. This Option-ROM UEFI driver is proprietary to the PCI device manufacturer and may be flashed to the PCI device ROM, and cannot be modified by third party software.

The purpose of this Option-ROM UEFI driver is to access the PCI device and its children devices during pre-OS environment. For example, a PCI-based storage controller and the disks connected to the PCI-based storage controller are accessed by system UEFI BIOS using the UEFI driver BIOS. Thus, Option-ROM BIOS is required for a PCI device to boot an OS. This requirement of a physical PCI device to load an Option-ROM BIOS makes it impossible for a software only product, such as "write-back caching" software or RAID software, to support booting an OS, as these softwares can only be loaded during the OS loading as a OS driver.

In a second method, the UEFI driver to be loaded into system may be saved in UEFI BIOS Non-Volatile Random Access Memory (NVRAM), and the system UEFI BIOS may load the UEFI driver during the startup boot procedure. This NVRAM area cannot be used by third party software developers because each system manufacturer has its own proprietary format. Accordingly, third party software trying to write to this NVRAM can damage the system beyond repair, and modifying the UEFI driver necessitates system BIOS modifications that may be performed only by the system manufacturer.

SUMMARY

Aspects of the exemplary embodiments provide a method for implementing and a computer-readable medium storing a program for a device-less and system agnostic UEFI driver.

According to an aspect of an exemplary embodiment, there is provided a method of loading a customized Unified Extensible Firmware Interface (UEFI) driver, the method including a computer processor copying an original Extensible Firmware Interface (EFI) boot application stored at a first location to a second location, replacing the original EFI boot application at the first location with a customized EFI boot application, copying an original Globally Unique Identifiers (GUID) Partition Table (GPT) stored at a third location to a fourth location, and replacing the original GPT at the third location with a customized GPT.

The customized GPT may include an EFI System Partition (ESP) partition entry that points to the ESP, the ESP including the customized EFI boot application, and the customized EFI boot application may be configured to cause installation of block Input/Output (I/O) protocol for the ESP having entry points through which I/O for operating system (OS) partitions of the original GPT is filtered.

The customized GPT may omit OS partition entries.

The customized EFI boot application may be further configured to cause execution of the original EFI boot application once the block I/O protocol for the ESP is installed.

The original EFI boot application may load the OS.

The original EFI boot application may be configured to cause installation of block I/O protocols for OS partition entries in the original GPT.

According to an aspect of an exemplary embodiment, there is provided a computer-readable recording medium having embodied thereon a customized Unified Extensible Firmware Interface (UEFI) driver, the customized UEFI driver including computer-readable code configured to cause a computer processor to copy an original Extensible Firmware Interface (EFI) boot application stored at a first location to a second location, replace the original EFI boot application at the first location with a customized EFI boot application, copy an original Globally Unique Identifiers (GUID) Partition Table (GPT) stored at a third location to a fourth location, and replace the original GPT at the third location with a customized GPT.

According to an aspect of an exemplary embodiment, there is provided a computer-readable recording medium having embodied thereon a customized Unified Extensible Firmware Interface (UEFI) driver, the customized UEFI driver including a customized Globally Unique Identifiers (GUID) Partition Table (GPT) and a customized EFI boot application, the customized GPT pointing to an EFI System Partition (ESP) storing the customized EFI boot application, and the customized EFI boot application configured to install block Input/Output (I/O) protocol for the ESP having entry points through which I/O for operating system (OS) partitions is filtered.

BRIEF DESCRIPTION OF THE DRAWINGS

The above and other aspects of the exemplary embodiments will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
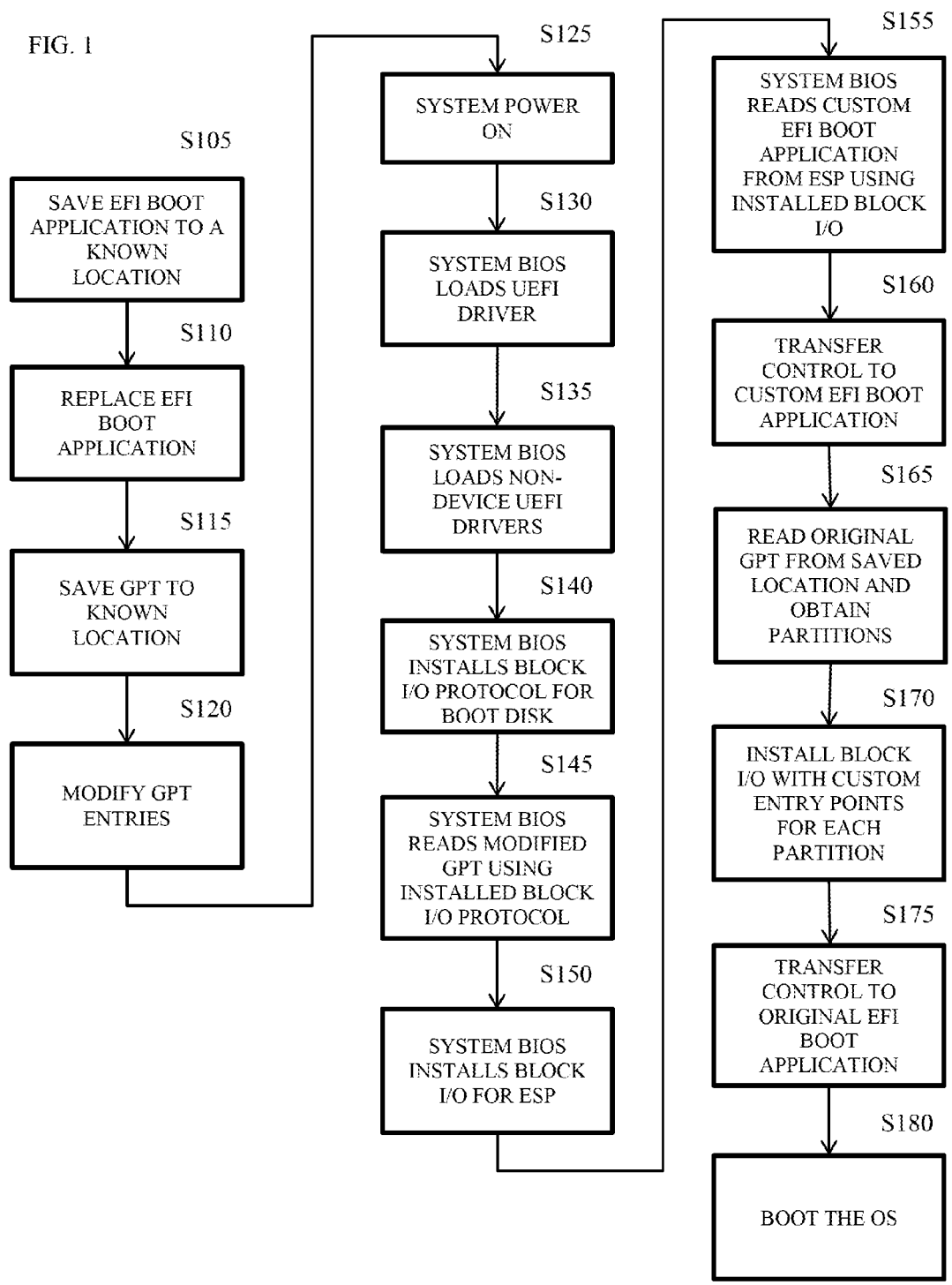
FIG. 1 illustrates a flowchart of a method for loading and executing a UEFI driver, according to an exemplary embodiment.

Hereinafter, exemplary embodiments will be described in detail with reference to the drawings.

In the following description, like drawing reference numerals are used for the like elements, even in different drawings. The matters defined in the description, such as detailed construction and elements, are provided to assist in a comprehensive understanding of the exemplary embodiments. However, the present inventive concept can be practiced without those specifically defined matters. Also, well-known functions or constructions are not described in detail since they would obscure the invention with unnecessary detail.

The operations of the methods described below, unless otherwise indicated, may be performed in any order. Alternatively, the operations may be performed simultaneously.

FIG. 1 illustrates a flowchart of a method for loading and executing a UEFI driver to filter I/O to storage devices without requiring dependency on a PCI device and/or modifying the system UEFI BIOS. By loading a custom UEFI driver without a PCI device or system UEFI BIOS modification, a software only product to support booting an OS is enabled.

The method of FIG. 1 may be performed through execution of a software application or module executed on a computer system to load the UEFI driver.

When a UEFI system boots from a storage disk, the System UEFI BIOS loads the Master Boot Record (MBR) of the disk, which is always present at sector 0 of the boot disk. If the MBR indicates that it is a Globally Unique Identifiers (GUID) Partition Table (GPT) disk, then system BIOS reads the GPT, enumerates the partitions on the disk, and installs block Input/Output (I/O) protocols for each of the partitions. block I/O protocol is an interface to access the partitions on a disk. Without block I/O protocol, the partitions on a disk cannot be accessed.

Once the block I/O protocol is installed for each of the partition, system UEFI BIOS looks for the EFI System Partition (ESP) that contains the OS boot manager (e.g. for Microsoft Windows, bootx64.efi is the copy of Microsoft Windows Boot Manager located at . . . efi\microsoft\boot\bootmgfw.efi). System UEFI BIOS accesses the ESP using block I/O protocol, loads the OS boot manager into memory and transfer controls to the OS boot manager, which uses block I/O protocol to access the OS partitions (e.g. C:) and loads the OS loader (e.g. for Microsoft Windows, winload.efi), which continues the loading and execution of the rest of the OS (e.g. Microsoft Windows).

According to the exemplary embodiment illustrated in FIG. 1, a custom OS boot manager may be provided, and the original OS boot manager may be saved to memory. The OS boot manager will be referred to as an EFI boot application.

According to the exemplary embodiment illustrated in FIG. 1, a custom GPT may also be provided. The original GPT may be modified to retain only the ESP partition entry, and all other partition entries may be removed from the GPT, to obtain the custom GPT. Optionally, entries pertaining to partitions not needed for OS booting may also be retained in the custom GPT. For example, a partition not needed for OS booting may be a recovery or backup partition. The original GPT may be saved towards the end of the disk.

As illustrated in FIG. 1, in step S105, a current EFI boot application is saved to memory, thereby creating a copy of the EFI boot application. In the Microsoft Windows OS, the EFI boot application may be bootx64.efi or bootmgfw.efi.

In step S110, the current EFI boot application is replaced with a customized EFI boot application. The current EFI boot application may be replaced by overwriting the current EFI boot application with the customized EFI boot application, or by editing the current EFI boot application. The customized EFI boot application, when executed, may fetch an original GPT stored in memory and install block I/O protocol for all valid partition entries (e.g. C:) in the GPT, except the ESP partition entry, using custom entry points that can filter I/O. The customized EFI boot application may include the UEFI driver entry points that need to be loaded for the custom block I/O protocols. Once block I/O protocols for all the valid partition entries are loaded, the customized EFI boot application may fetch the original EFI boot application from memory, load the original EFI boot application, and transfer control to the original EFI boot application for loading the OS.

In step S115, the GPT is saved to memory, thereby creating a copy of the GPT. The copy of the original GPT may be saved towards the end of the disk.

In step S120, all GPT entries other than the ESP entry are removed from the GPT. Optionally, in addition to the ESP entry, entries pertaining to partitions not needed for OS booting may also be retained in the GPT. Accordingly, the modified GPT may constitute a customized GPT.

At this point, the UEFI driver is loaded, and the system is prepared for execution of the new UEFI driver.

During startup or reboot, in step S125, the UEFI system boots from the GPT disk.

In step S130, when the UEFI system boots from a storage disk, the system UEFI BIOS loads the MBR of the disk, which is always present at the first sector (i.e., sector 0) of the booting disk.

If the MBR indicates that the disk is a GPT disk, then the system BIOS optionally loads non-device UEFI drivers in step S135.

In step S140, system BIOS begins to install block I/O protocol for partitions of the disk.

In step S145, system BIOS reads the GPT, which is the customized GPT of step S120, and enumerates the partitions on the disk indicated by the GPT, which may only be the ESP partition entry in the customized GPT of step S120. As discussed above, other partition entries unnecessary for OS booting may be retained, such as a backup or recovery partition, and thus such partition entries may also be read in step S145.

In step S150, system UEFI BIOS installs the block I/O protocols for the read partitions, namely the block I/O protocol for the ESP partition. Again, other partition entries unnecessary for OS booting may be retained, such as a backup or recovery partition, and thus block I/O protocols for such partitions may also be installed in step S150.

In step S155, the system BIOS reads the EFI boot manager from the ESP partition using the installed block I/O protocol. The EFI boot manager is the customized EFI boot manager of step S110.

In step S160, system BIOS transfers control to the EFI boot manager.

As noted above, the block I/O protocol is an interface to access the partition on a disk, without which the partitions on a disk cannot be accessed. Because partition entries other than the ESP partition entry are omitted from the customized GPT, block I/O protocol is installed for only ESP partition. Accordingly, at this point, the disk appears raw with no other valid partitions.

In step S165, the EFI boot application fetches the original GPT, which is saved at a location known only to the customized EFI boot application in step S115.

In step S170, the EFI boot application reads the partition entries of the original GPT, and installs block I/O protocols with custom entry points for each of the valid partition entries corresponding to the partitions (e.g. OS partitions like C:), except for the ESP, which has been previously loaded. Because block I/O protocols for these partitions were not installed, these newly loaded partitions were not visible to system UEFI BIOS or any other UEFI application until now.

After this point, because block I/O protocols for each of the partitions (including OS partitions, e.g. C:\) are subsequently installed, all the I/O directed to these partitions go through the block I/O protocol for the ESP loaded in step S150, which includes the custom entry points. This enables filtering of the I/O to these newly loaded partitions.

In step S175, once the block I/O protocols are installed for all the remaining valid partitions in the original GPT, the EFI boot application loads the original EFI boot manager from memory, and transfers control to the original EFI boot manager, which loads the OS loader. The OS loader continues the loading and execution of the OS in step S180.

All the I/O to the OS partitions, and other partitions for which block I/O protocols are installed, can now be filtered.

Figure 2:
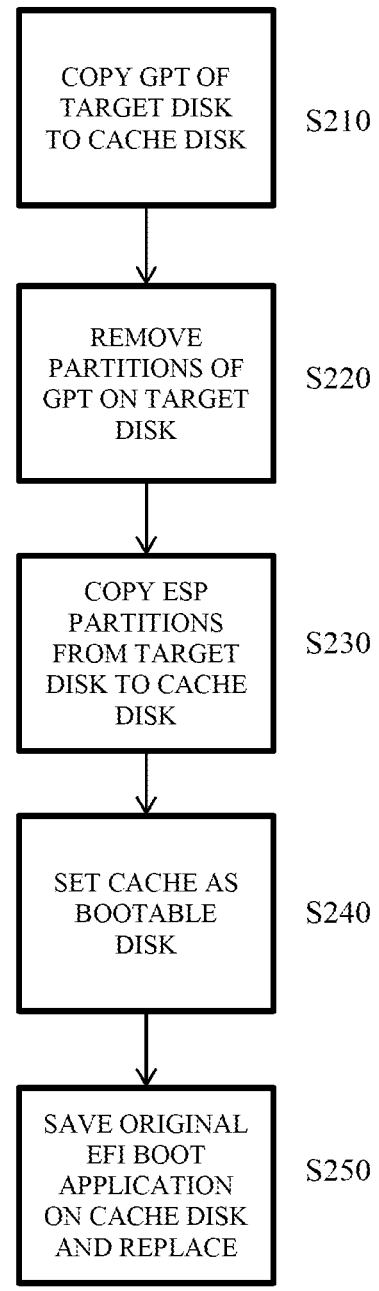
FIG. 2 illustrates a flowchart of a method of performing "write-back caching," according to an exemplary embodiment.

FIG. 2 illustrates a method for performing "write-back caching" using an UEFI driver, according to an exemplary embodiment.

According to an aspect of an exemplary embodiment, a use of the UEFI driver may be a "write-back caching" software only product. Such a software needs to be present in a pre-OS UEFI environment to support booting an OS, as some of the data may be present on the cache device and may not be present on the target storage disk (disk being cached).

A traditional approach employs a PCI based storage controller, on which has an Option ROM UEFI is installed. Since all the I/O are performed using this UEFI driver, the PCI based storage controller can re-direct the I/O to the cache device whenever required. But, this requires the caching logic to be inside the UEFI driver of the PCI based storage controller, which is not possible for third party software.

On the other hand, according to aspects of the exemplary embodiments, by using a separate UEFI driver/application loaded into memory, the I/O may be filtered without the need of modifying the proprietary UEFI driver or System UEFI BIOS.

According to aspects of the exemplary embodiments, this approach also has the advantage of filtering I/O to any PCI-device and its children, while a UEFI driver residing on a PCI device can only access the I/O directed to that specific PCI-device and its children. Aspects of the exemplary embodiments are even more attractive for software only products like "write-back caching," "software RAID," and "Full Disk Encryption" by allowing the involved storage disks (e.g., target disk and cache disk) to be on different storage controllers.

In case of "write-back caching," this approach can be further used to boot almost completely from the cache disk, thereby alleviating spinning of the target storage disk unless absolutely required. The method of "write-back caching" is illustrated in FIG. 2.

In step S210, a copy of the GPT of target disk is saved on the cache disk at the same location as target disk. The cache disk may be a high speed disk, such as a solid state disk (SSD).

In step S220, all the partitions of the GPT on the target storage disk are removed.

In step S230, the ESP partitions are copied from the target disk to the cache disk.

In step S240, set the cache disk as the bootable disk.

In step S250, the original EFI boot application is saved, as described above with respect to FIG. 1, on the cache disk, and the original EFI boot application on the cache disk is replaced with the customized EFI application.

According to an aspect of this exemplary embodiment, a system may boot from the cache SSD (instead of the target disk), load the custom EFI boot application from the ESP on the cache disk, which after setting up the block I/O protocol loads the original EFI boot application, but this time from the cache disk itself. Accordingly, spinning of the target disk is avoided until there is a read miss on the cache disk.

A similar approach may be used for resuming from sleep states, like hibernation.

According to aspects of the exemplary embodiment, this approach provides boot and resume from hibernation speed almost identical to the case where the entire OS is installed on the cache disk.

According to aspects of the exemplary embodiments, a new method of loading a custom UEFI driver without a PCI device or system UEFI BIOS modification is described. Thereby, a software only product using UEFI, which supports booting and resume from hibernation, is possible.

According to aspects of the exemplary embodiments, a UEFI driver may be loaded without a PCI device dependency and a UEFI driver may be loaded without system BIOS modifications.

The operations of the methods discussed above may be implemented by a computer processor (e.g. central processing unit, CPU) executing computer-readable codes stored on a computer-readable recording medium (e.g. disk, memory, CD-ROM, etc.). The computer processor may be a general purpose processor of a computer, a specialized processor of a computer, or a processor of a storage controller. The computer-readable codes may include an installation program for loading the UEFI driver to a memory, and may include the UEFI driver that is loaded to memory, which is executed by the computer processor upon boot of the computer.

Although a few exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. A method of loading a customized Unified Extensible Firmware Interface (UEFI) driver by a computer processor, the method comprising:

copying an original Globally Unique Identifiers (GUID) Partition Table (GPT) stored at a first location in memory to a first backup location in memory, wherein the original GPT comprises an operating system (OS) partition entry that identifies an OS partition at which the OS is stored and an Extensible Firmware Interface (EFI) System Partition (ESP) entry that identifies the ESP;

replacing the original GPT at the first location with a customized GPT, wherein the customized GPT comprises the ESP entry and omits the OS partition entry;

copying an original EFI boot application stored at the ESP to a second backup location, the original EFI boot application configured to load an OS loader that loads the OS from the OS partition via OS block Input/Output (I/O) protocol that is an interface to access the OS partition; and replacing the original EFI boot application stored at the ESP with a customized EFI boot application, wherein the customized EFI boot application is configured to cause installation of ESP block Input/Output (I/O) protocol that is an interface to access the ESP having entry points through which the OS block I/O protocol of the original GPT is filtered, load the original GPT from the first backup location in memory, load the OS block I/O protocol based on the OS partition entry in the original GPT, and load the original EFI boot application from the second backup location in memory.

2. The method of claim 1, wherein the customized EFI boot application is further configured to cause execution of the original EFI boot application once the ESP block I/O protocol is installed.

3. The method of claim 2, wherein the original EFI boot application loads the OS via the OS loader.

4. A non-transitory computer-readable recording medium having embodied thereon a customized Unified Extensible Firmware Interface (UEFI) driver, the customized UEFI driver comprising computer-readable code configured to cause a computer processor method of loading a customized UEFI driver, the method comprising:

copying an original Globally Unique Identifiers (GUID) Partition Table (GPT) stored at a first location in memory to a first backup location in memory, wherein the original GPT comprises an operating system (OS) partition entry that identifies an OS partition at which the OS is stored and an Extensible Firmware Interface (EFI) System Partition (ESP) entry that identifies the ESP;

replacing the original GPT at the first location with a customized GPT, wherein the customized GPT comprises the ESP entry and omits the OS partition entry;

copying an original EFI boot application stored at the ESP to a second backup location, the original EFI boot application configured to load the an OS loader that loads OS from the OS partition via OS block Input/Output (I/O) protocol that is an interface to access the OS partition; and replacing the original EFI boot application stored at the ESP with a customized EFI boot application, wherein the customized EFI boot application is configured to cause installation of ESP block Input/Output (I/O) protocol that is an interface to access the ESP having entry points through which the OS block I/O protocol of the original GPT is filtered, load the original GPT from the first backup location in memory, load the OS block I/O protocol based on the OS partition entry in the original GPT, and load the original EFI boot application from the second backup location in memory.

5. The non-transitory computer-readable recording medium of claim 4, wherein the customized EFI boot application is further configured to cause execution of the original EFI boot application once the ESP block I/O protocol is installed.

6. The non-transitory computer-readable recording medium of claim 5, wherein the original EFI boot application loads the OS via the OS loader.

7. A non-transitory computer-readable recording medium having embodied thereon a customized Unified Extensible Firmware Interface (UEFI) driver, the customized UEFI driver comprising:

an original Globally Unique Identifiers (GUID) Partition Table (GPT) stored at a first backup location in memory, wherein the original GPT comprises an operating system (OS) partition entry that identifies an OS partition at which the OS is stored and an Extensible Firmware Interface (EFI) System Partition (ESP) entry that identifies the ESP;

a customized GPT, wherein the customized GPT comprises the ESP entry and omits the OS partition entry;

an original EFI boot application stored at a second backup location, the original EFI boot application configured to load an OS loader that loads the OS from the OS partition via OS block Input/Output (I/O) protocol that is an interface to access the OS partition; and a customized EFI boot application stored at the ESP, wherein the customized EFI boot application is configured to cause installation of ESP block Input/Output (I/O) protocol that is an interface to access the ESP having entry points through which the OS block I/O protocol of the original GPT is filtered, load the original GPT from the first backup location in memory, load the OS block I/O protocol based on the OS partition entry in the original GPT, and load the original EFI boot application from the second backup location in memory.

8. The non-transitory computer-readable recording medium of claim 7, wherein the customized EFI boot application is further configured to cause execution of the original EFI boot application once the ESP block I/O protocol is installed.

9. The non-transitory computer-readable recording medium of claim 8, wherein the original EFI boot application loads the OS via the OS loader.

* * * * *